(12) United States Patent
Raghavan et al.

(10) Patent No.: US 8,260,597 B1
(45) Date of Patent: Sep. 4, 2012

(54) ACCESSING TIME DRIVEN ENVIRONMENT DATA STORES FROM A STATE DRIVEN ENVIRONMENT

(75) Inventors: Vijay Raghavan, Framingham, MA (US); Jason Breslau, Littleton, MA (US)

(73) Assignee: The MathWorks, Inc., Natick, MA (US)

( * ) Notice: Subject to any disclaimer, the term of this patent is extended or adjusted under 35 U.S.C. 154(b) by 309 days.

(21) Appl. No.: 11/157,670

(22) Filed: Jun. 20, 2005

(51) Int. Cl.
*G06F 17/50* (2006.01)
*G06F 17/00* (2006.01)
*G06F 9/44* (2006.01)

(52) U.S. Cl. .................. 703/13; 703/1; 703/6; 719/328

(58) Field of Classification Search .................. 703/1, 2, 703/6, 13, 14, 15, 16, 17, 19, 20, 22; 715/740, 715/751; 719/312, 328–329
See application file for complete search history.

(56) References Cited

U.S. PATENT DOCUMENTS

| | | | |
|---|---|---|---|
| 6,629,153 B1 * | 9/2003 | Gupta et al. | 719/316 |
| 7,191,184 B2 * | 3/2007 | Laborde et al. | 1/1 |
| 7,478,408 B2 * | 1/2009 | Sesma | 719/328 |

OTHER PUBLICATIONS

Tiwari, "Formal Semantics and Analysis methods for Simulink Stateflow Models", Technical report, SRI International, 2002, 12 pages.*
Agrawal et al. "Semantic Translation of Simulink/Stateflow Models to Hybrid Automata Using Graph Transformations" Electric Notes in Theoretical Computer Science, vol. 109, Dec. 14, 2004, pp. 43-56.*
The Mathworks, Inc. "Stateflow and Stateflow Coder User's Guide Version 5" Jul. 2002, 882 pages.*

* cited by examiner

*Primary Examiner* — Suzanne Lo
(74) *Attorney, Agent, or Firm* — Nelson Mullins Riley & Scarborough LLP (57) ABSTRACT

A method, apparatus and system for accessing data that exists within a first environment, such as a time driven environment, from within a second environment such as a state driven environment. Access to this data is accomplished using an interface element in communication with both environments. To allow access to data in the first environment, the second environment is parsed to locate references to any data to be shared located outside of the second environment. Once these data references are located, resolution of these references outside of the second environment is accomplished such that the data to be shared is shared between the first and second environments.

43 Claims, 8 Drawing Sheets

*(Prior Art)*

ACCESSING TIME DRIVEN ENVIRONMENT DATA STORES FROM A STATE DRIVEN ENVIRONMENT

FIELD OF THE INVENTION

The present invention relates to the sharing of data between a plurality of environments, and more particularly to a system, method and apparatus allowing for the access of data of a time driven environment from within a state driven environment.

BACKGROUND OF THE INVENTION

Graphical modeling environments come in a number of different varieties. Some graphical modeling environments are time-based and some are state based. In a time based environment it is the passage of time that is the motivating force which drives model execution. Alternatively, in a state based environment it is changes in state which motivate model execution. Each model environment offers numerous benefits to a user, wherein the selection of a time or state driven environment is often based upon the problem to be solved. For example, problems requiring testing and signal processing within a time varying system are best analyzed using a time-driven environment, whereas logic based problems are oftentimes best represented and analyzed using a state driven environment.

An exemplary time-based environment for simulating dynamic systems can be found in Simulink®, which provides tools for modeling and simulating a variety of dynamic systems in one integrated, graphical environment. One of the primary tools used for modeling and simulation of these dynamic systems are blocks. These blocks can be easily manipulated to build block diagrams of a model or system. Each block can implement a function which is commonly used in modeling the system. Example blocks include continuous and discrete dynamics blocks, such as integration and delay blocks or algorithmic blocks, such as sum, product, and lookup table blocks. Furthermore, a user can customize each block, or design new blocks, to more accurately represent the necessary function for use in solving the present problem, simulate the behavior of the system, analyze the performance of the system, and refine the design of the system. Simulink® allows users to design target systems through a user interface that allows drafting of block diagrams of the target systems. All of the blocks in a block library provided by Simulink® and other programs are available to users when the users are building the block diagram of the target systems. Individual users may be able to customize this set of available blocks to: (a) reorganize blocks in some custom format, (b) delete blocks they do not use, and (c) add custom blocks they have designed. The blocks may be dragged through some human-machine interface (such as a mouse or keyboard) from the block library on to the window (i.e., model canvas). Simulink® also allows users to simulate the designed target systems to determine the behavior of the systems.

Figure 1:
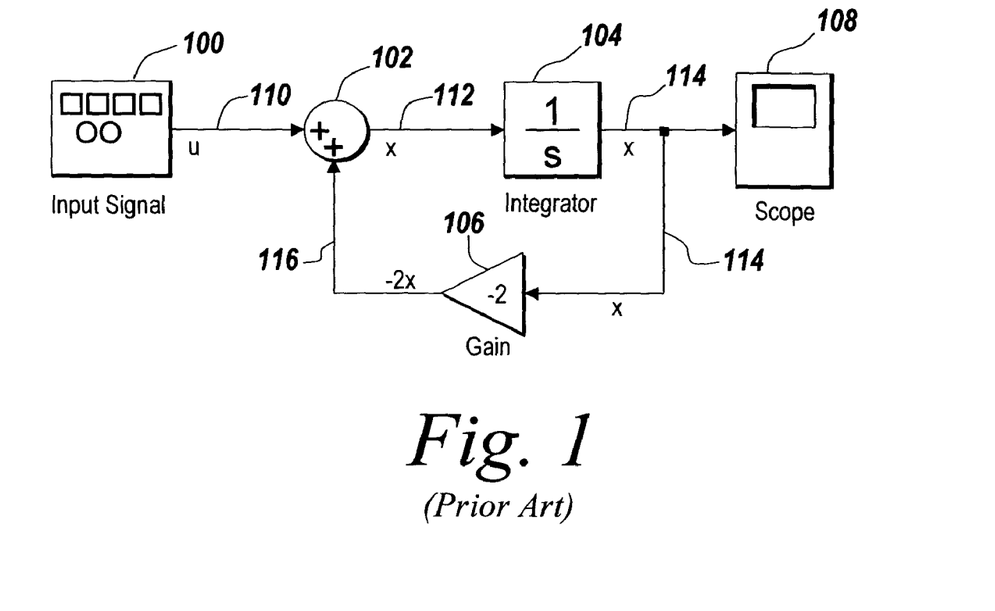
FIG. 1 shows an exemplary Simulink® model.

FIG. 1 shows an example of a Simulink® model. The Simulink® model makes use of blocks and arrows to connect the blocks, when forming the model. Each arrow connecting one block to another represents a signal having a value. Input Signal 100 generates an input signal and sends the signal to a Sum block 102 via link 110. Link 114 communicates the value of the continuous-time state of the Integrator block 104 as a signal from the Integrator block 104 to a Scope block 108 for display, and also sends the signal to a Gain block 106 through link 116. Gain block 106 performs calculation on the input signal from link 116 and outputs the result through link 118 to the Sum block 102. The Sum block 102 adds the signal from link 110 and the signal from link 118 and outputs the result through link 112 to the Integrator block 104. The Integrator block 104 takes the signal from link 112 and performs integration on the value forwarded by the signal to produce an updated output on link 114 at a new point in time. The model continues on indefinitely or until a predetermined condition is achieved, a time period is attained, the user interrupts the execution, or any other termination condition is met.

In contrast to the time based graphical model environment of Simulink®, Stateflow® provides an exemplary state-based flow diagram environment. Stateflow® provides a graphical environment for modeling and designing event-driven systems. Stateflow® describes complex system behavior using finite state machine theory, flow diagram notations, and state-transition diagrams. Stateflow® models state diagrams that graphically represent hierarchical and parallel states and the event-driven transitions between the states of the systems. Stateflow® is integrated with Simulink®, which enables each of the state diagrams to be represented as its own block. Based on the state diagrams created in Stateflow®, Simulink® executes the systems to analyze the behavior of the systems.

Figure 2A:
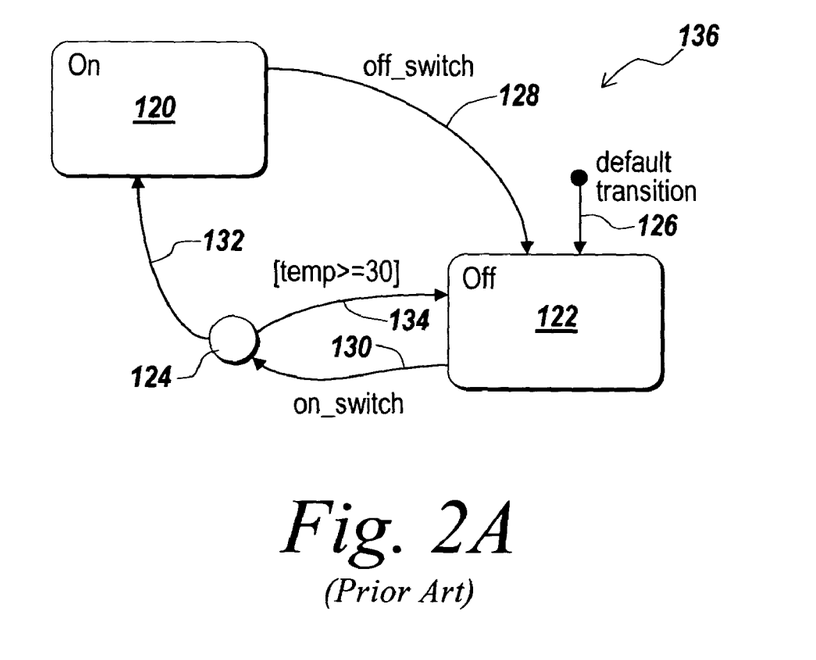
FIG. 2A shows an exemplary Stateflow® diagram.

An example of a Stateflow® form of state diagram model is shown in FIG. 2A. Each arrow in the Stateflow® models represents a transition, which is a graphical object that, in most cases, links one object to another. One end of a transition is attached to a source object and the other end to a destination object. The source is where the transition begins and the destination is where the transition ends. A transition label describes the circumstances under which the system moves from one state to another. It is always the occurrence of some event that causes a transition to take place. The exemplar Stateflow® diagram as shown in FIG. 2 is embedded in a Simulink® environment. The Simulink® signals are provided to Stateflow®, and Stateflow® uses this information to decide whether there are changes in states.

Within the Stateflow® diagram of FIG. 2A, there are two states: an on state 120 and an off state 122. The default transition 126 determines the initial state is the off state 122. When an on_switch transition 130 is enabled, the enable signal passes to junction 124 and determines whether the temp 134 data is greater or equal to 30, if not, then the enable signal is passed on to signal link 132 and further finish the transition to the on state 120. Now the on state 120 is active and off state 122 inactive. The off state 122 will become active again when the off_switch signal 128 is enabled, at which time the on state 120 will be inactive.

For reasons of simplicity, hereinafter time driven environments will be universally addressed relative to a Simulink® environment example. Furthermore, state driven environments will be universally addressed relative to a Stateflow® environment example. Such a universal application of the Simulink® and Stateflow® environments is not intended to be limiting, and is solely used to aid in describing the present invention.

When working with both Simulink® and Stateflow® environments, it is often difficult to allow for the Simulink® environment to share data with a Stateflow® environment efficiently. This data may include various variable, functionality data or event data. Using current technology, in order for Simulink® data to be accessed from Stateflow® environment, it is necessary to connect the input ports and output ports of the Stateflow® blocks to separate predefined blocks for sharing data between the two environments. This indirection causes memory and runtime inefficiency due to the copying of data between the predefined blocks for receiving and transmitting input and output from the Stateflow® blocks. In addition, this indirection also results in latency where the changes to the data to be shared is not reflected instantaneously.

Therefore, a need exists for a system, method, and apparatus wherein the accessing of data and parameters in a time based graphical programming environment, such as Simulink®, can occur from within a state driven environment such as Stateflow®. In doing so, a user can readily refer to data that exists in the time driven environment directly. This data can then be used in state/transition action statement and other execution specifications within a state driven environment such that the state driven environment automatically resolves this data to the data within the time driven environment. Data accessed and shared in this manner may include various variables that are local or global, functionality data or event data.

SUMMARY

According to an exemplary embodiment, a method for sharing data across a plurality of graphical modeling environments is provided. The method includes providing a first environment, the first environment containing a plurality of executable elements. The method further includes providing a second environment, the second environment being in communication with the first environment using an interface element. The first and second environments share data using the interface element.

According to another exemplary embodiment, a system for sharing data in a first graphical modeling environment with a second graphical modeling environment is provided. The system includes a parsing element for locating references to data in the first graphical modeling environment and a resolution element. The resolution element resolves references from the second graphical modeling environment to the first graphical modeling environment. The system includes an interface element, the interface element providing for the sharing of a data in a first graphical modeling environment with a second graphical modeling environment using the results of the resolution element.

In another exemplary embodiment, a computer readable medium comprising instructions for sharing data in a first graphical modeling environment with a second graphical modeling environment is provided. The instructions cause a processor to provide an interface element in the first graphical modeling environment. The interface element is accessible from the second graphical modeling environment. The instructions further cause the processor to parse the second graphical modeling environment to locate references to data within the first graphical modeling environment. The references from the second graphical modeling environment are resolved to the first graphical modeling environment. The instructions also cause the processor to share the data in the first graphical modeling environment with the second graphical modeling environment using the interface element.

In yet another exemplary embodiment, a distribution system for transmitting, via a transmission medium, computer data signals representing device readable instructions for a method for sharing data in a first graphical modeling environment with a second graphical modeling environment is provided. The instructions include providing an interface element in the first graphical modeling environment, wherein the interface element is accessible from the second graphical modeling environment. The instructions also include parsing the second graphical modeling environment to locate references to data within the first graphical modeling environment. The references from the second graphical modeling environment are resolved to the first graphical modeling environment and the data in the first graphical modeling environment is shared with the second graphical modeling environment using the interface element.

According to another exemplary embodiment, a diagnostic method for sharing data in a first graphical modeling environment with a second graphical modeling environment is provided. The method includes providing a interface element accessible by the first and second graphical modeling environments and parsing the second graphical modeling environment to locate references to data within the first graphical modeling environment. The references from the second graphical modeling environment are resolved to the first graphical modeling environment. The method further includes sharing the data in the first graphical modeling environment with the second graphical modeling environment using the interface element and analyzing the sharing of the data to diagnosis sharing errors.

In still another exemplary embodiment a system for data sharing between a first graphical modeling environment and a second graphical modeling environment is provided. The system includes an interface element, a first graphical modeling environment, a second graphical modeling environment, a sharing mechanism and an analysis element. The first graphical modeling environment contains a plurality of executable elements. The second graphical modeling environment is in communication with the first graphical modeling environment using the interface element. The sharing mechanism is capable of sharing data between the first and second graphical modeling environments using the interface element. The analysis element analyzes data sharing to diagnosis sharing errors between the first and second graphical modeling environments.

In still another exemplary embodiment a computer readable medium comprising instructions for sharing data between a first graphical modeling environment and a second graphical modeling environment is provided. The instructions cause a processor to provide a first graphical modeling environment, the first graphical modeling environment containing a plurality of executable elements. The instructions further cause the processor to provide a second graphical modeling environment, the second graphical modeling environment being in communication with the first graphical modeling environment using an interface element. The data is shared between the first and second graphical modeling environments using the interface element. The sharing of data is analyzed within the first graphical modeling environment to diagnosis sharing errors between the first and second graphical modeling environments.

According to another exemplary embodiment, a distribution system for transmitting, via a transmission medium, computer data signals representing device readable instructions for a method for sharing data between a first graphical modeling environment and a second graphical modeling environment is provided. A first graphical modeling environment is provided, the first graphical modeling environment contains a plurality of executable elements. A second graphical modeling environment is provided, the second graphical modeling environment is in communication with the first graphical modeling environment using an interface element. The data is shared between the first and second graphical modeling environment using the interface element. The sharing of data is analyzed within the first graphical modeling environment to diagnosis sharing errors between the first and second graphical modeling environments.

BRIEF DESCRIPTION OF THE DRAWINGS

The present invention will become better understood with reference to the following description and accompanying drawings, wherein.

The aforementioned features and advantages, and other features and aspects of the present invention, will become better understood with regard to the following description and accompanying drawings, wherein.

DETAILED DESCRIPTION

FIGS. 1 through 10, wherein like parts are designated by like reference numerals throughout, illustrate an example embodiment of a method, system and apparatus for sharing data across a plurality of environments in accordance with the present invention. Although the present invention will be described with reference to the example embodiments illustrated in the figures, it should be understood that many alternative forms can embody the present invention. It is, therefore, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment will be described below solely for illustrative purposes relative to a time-based block diagram environment and a state-based and flow diagram environment. Although the illustrative embodiment will be described relative to the time-based block diagram environment and the state-based and flow diagram environment, one of skill in the art will appreciate that the present invention may apply to other graphical programming/modeling environments, including data flow diagram environments and Unified Modeling Language (UML) environments, as long as the graphical model has some notion of semantics that allows it to be transformed into an executable for a computer processor/microcontroller or directly synthesized in application-specific hardware. Those of skill in the art will appreciate that the present invention may be practiced relative to models implemented in other graphical modeling environments, including but not limited to LabVIEW from National Instruments Corporation of Austin, Tex., and Rational Rose from IBM of White Plains, N.Y.

The illustrative embodiment of the present invention provides a time driven block diagram environment in which data in the time driven block diagram environment can be readily accessed within a state driven environment. The illustrative embodiment enables users to thereby incorporate data from a time driven environment into a state driven environment simulation or program. In the present embodiment, the time driven environment is a Simulink® environment, and the state driven environment is a Stateflow® environment. These are two exemplary environments used solely for illustrative purposes and clarity in describing the invention, and are not to be construed as limiting of the scope of the present invention. Using the Simulink® and Stateflow® environments, a user of the Stateflow® environment can simply refer to a parameter or data within the Simulink® environment by name within the state/transition statement of the Stateflow® programming language. Following this user selection of a parameter or data store in the Simulink® environment the resolution of these parameters or data stores is automatically accomplished between the Simulink® and Stateflow® languages. The illustrative embodiments further provide for the diagnosis of data sharing between environments wherein a variety of potential errors may surface due to the interaction and sharing of data stores or parameters between environments.

Figure 2B:
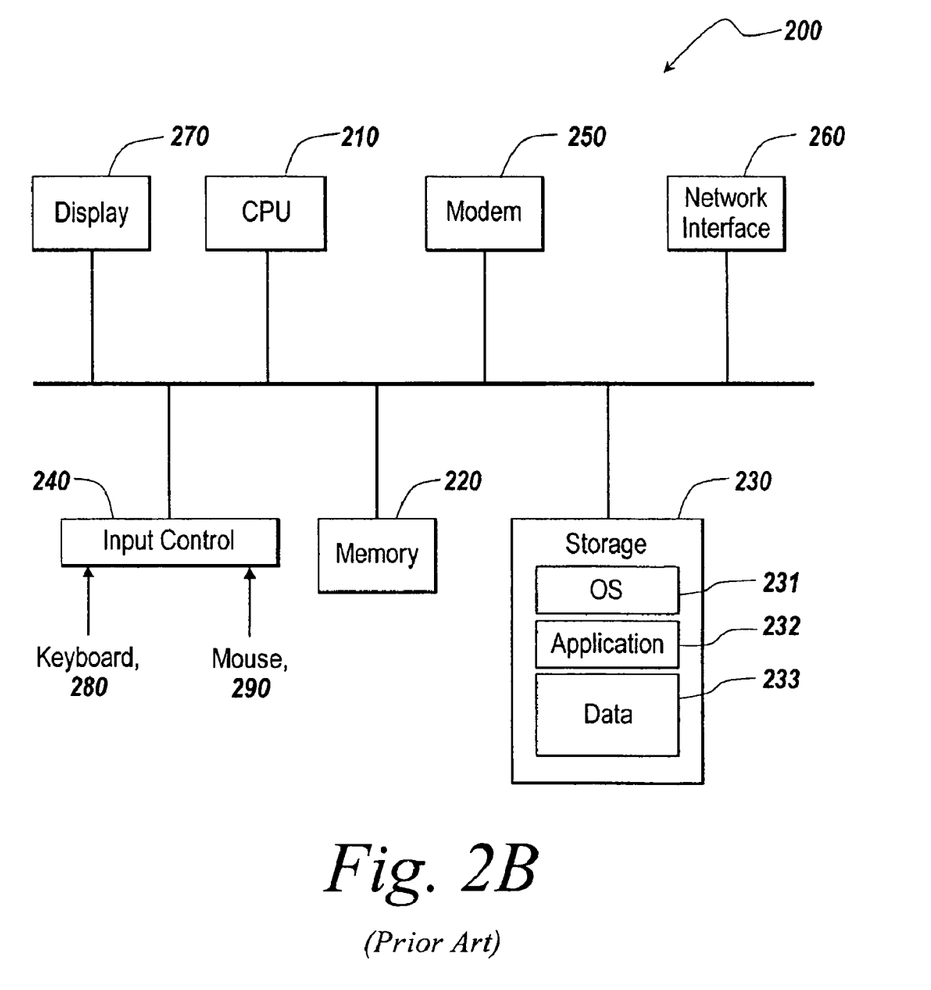
FIG. 2B shows an exemplary computing device suitable for practicing principles of the invention.

FIG. 2B is an exemplary computing device 200 suitable for practicing the illustrative embodiment of the present invention, which provides a block diagram environment. One of ordinary skill in the art will appreciate that the computing device 400 is intended to be illustrative and not limiting of the present invention. The computing device 200 may take many forms, including but not limited to a workstation, server, network computer, quantum computer, optical computer, Internet appliance, mobile device, a pager, a tablet computer, and the like.

The computing device 200 may be electronic and include a Central Processing Unit (CPU) 210, memory 220, storage 230, an input control 240, a modem 250, a network interface 260, a display 270, etc. The CPU 210 controls each component of the computing device 200 to provide the block diagram environment and to apply a coding standard to a block diagram in the block diagram environment. The memory 220 temporarily stores instructions and data and provides them to the CPU 210 so that the CPU 210 operates the computing device 200 and runs the block diagram environment.

The storage 230 usually contains software tools for applications. The storage 230 includes, in particular, code 231 for the operating system (OS) of the device 200, code 232 for applications running on the operation system including applications for providing the block diagram environment, and data 233 for block diagrams created in the block diagram environment and for one or more coding standards applied to the block diagrams.

The input control 240 may interface with a keyboard 280, a mouse 290, and other input devices. The computing device 200 may receive through the input control 240 input data necessary for creating block diagrams, such as the selection of the attributes and operations of component blocks in the block diagrams. The computing device 200 may also receive input data for applying a coding standard to a block diagram, such as data for selecting the coding standard, data for customizing the coding standard, data for correcting the violation of the coding standard in the block diagram, etc. The computing device 200 may display in the display 270 user interfaces for the users to edit the block diagrams. The computing device 200 may also display other user interfaces, such as a user interface for selecting a coding standard, a user interface for customizing the coding standard, a user interface for displaying a corrected block diagram that removes the violation of the coding standard, etc.

Figure 3:
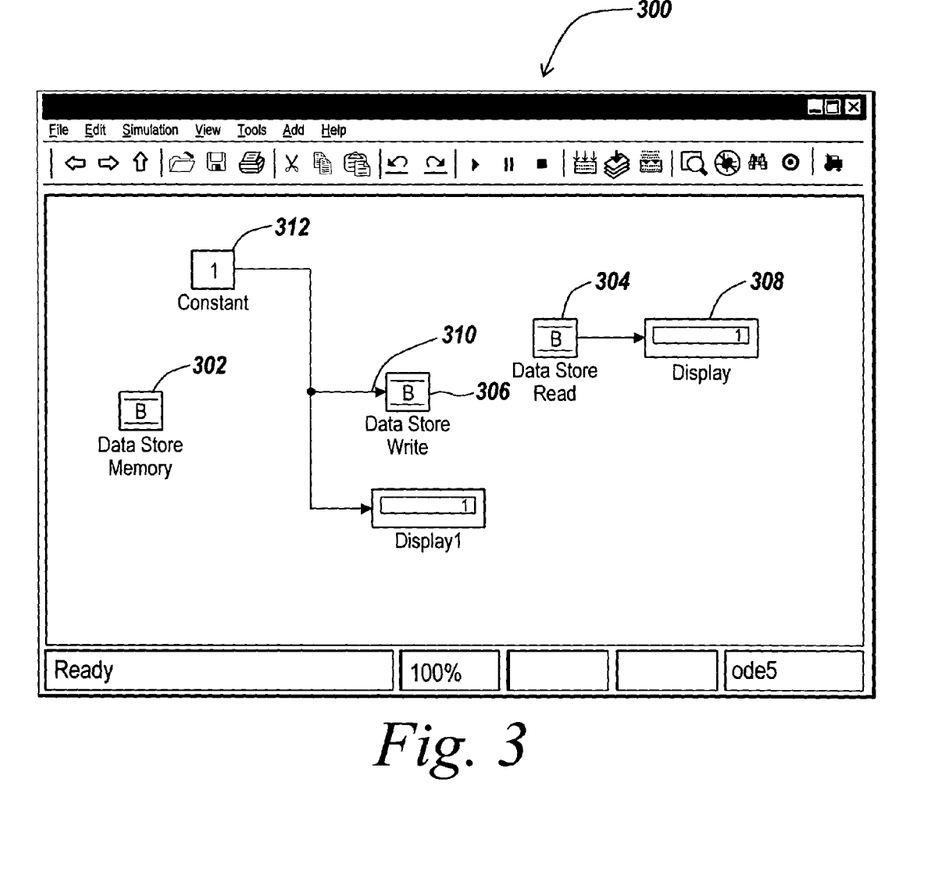
FIG. 3. shows an exemplary Simulink® model suitable for practicing principles of the present invention.

A simplified sample Simulink model 300 employing a Data Store Memory block is illustrated in FIG. 3. As shown in FIG. 3 a Data Store Memory block 302 is a block for use in a graphical model environment that can provide data that may be accessible at any point in a model hierarchy at or below the level in which it is defined. Because they are accessible across model levels, Data Store Memory Blocks 302 allow subsystems and model references to share data without having to use I/O ports to pass the data from level to level.

The Data Store Memory (DSM) block 302 provides for the defining and initializing of a named shared data store space. For the purposes of clarity, a "data store" will be herein defined as an allocated region of memory capable of being accessed by a variety of associated elements. A data store is defined by a Data Store Memory block. A data store traditionally has a specific name associated with it, such that the data store is sufficiently defined to allow access by associated elements. Acceptable elements include, but are not limited to, Data Store Read 304 or Data Store Write 306 blocks that have the same data store name. A Data Store Read 304 blocks is capable of reading from a DSM block 302 and a Data Store Write 306 block is capable of writing to a DSM 302 block.

The initial Data Store Memory block 302, which defines an initial data store, further defines which Data Store Read 304 and Data Store Write 306 blocks can access the specific data store. For example, Data Store Memory blocks 302 located in a top level system may provide for the access of the data store memory location by Data Store Read 304 and Data Store Write 306 blocks which are located anywhere in the graphical model. In the alternative, a Data Store Memory block 302 that is located in a subsystem may only provide access to the data store by Data Store Read 304 and Data Store Write 306 blocks located in the same subsystem. For illustrative purposes, FIG. 3 illustrates Data Store Memory 302, Data store Read 304 and Data Store Write 306 blocks, all of which are located within the same top level system.

Each Data Store Memory 302 block may further allow for the configuration of a variety of parameters associated with the Data Store Memory 302 block. For example, an initial data store memory region may be named (i.e. Data Store "A") such that Data Store Read 304 and Data Store Write 306 blocks with the same name can read from this memory configuration. Additional parameters such as the initial Data Store Memory 302 value, size, storage class and associated Simulink signal may further be defined to thereby allow Data Store Read 304 and Data Store Write 306 blocks that reference the memory region via the same name to communicate with the Data Store Memory 302 block.

As set forth prior, a Data Store Memory 302 block may have numerous Data Store Read 304 and Data Store Write 306 blocks associated with it. For simplicity purposes, the present FIG. 3 only illustrates a single Data Store Read 304 and Data Store Write 306 block. The Data Store Read 304 block copies data from the named data store to its output. This copying can occur at a fixed or variable sample time, as required by a user of the graphical model environment. The data is initialized by a Data Store Memory block and possibly written by a Data Store Write 306 block. While not currently illustrated, one skilled in the art will recognize that more than one Data Store Read 304 block can read from the same data store as defined by a Data Store Memory 302 block. In the present embodiment, the contents of the Data Store Read 304 block are in turn passed to a Display 308. Said display 308 may take numerous forms including but not limited to a text based display, graphical display, or audiovisual display.

Data Store Write 306 block of the present embodiment provides for the copying of the value provided to the input 310 of the Data Store Write block. This input value is copied to the prior defined Data Store Memory 302 location having the same name as the current Data Store Write block 306. Copying of data such as this can occur at a fixed or variable interval. In the present embodiment, the input of the Data Store Write block 301 is provided by a signal source 312 that remains constant. In use, however, this signal source 312 may take numerous forms wherein variable signals are provided to the input 310 of the Data Store Write block 306. For example, real or complex signal of any data type supported by Simulink, as well as fixed-point data types can be provided to the Data Store Write block 306. Additionally, functionality data, event data or global or local variables can be provided to the Data Store Write block 306. Furthermore, each write operation which the Data Store Write 306 block provides serves to write over the prior data store located within the Data Store Memory 302 block, thereby replacing the previous contents. While not currently illustrated, it should be noted that more than one Data Store Write 306 block can write to the same data store, as defined by a Data Store memory 302 block. Inherent in such an example, however, is a high degree of unpredictability, should two or more Data Store Write 306 blocks attempt to write to the same Data Store memory Block 302. In such a situation it is difficult to verify data integrity thereby making calculations using this data susceptible to errors.

Figure 4:
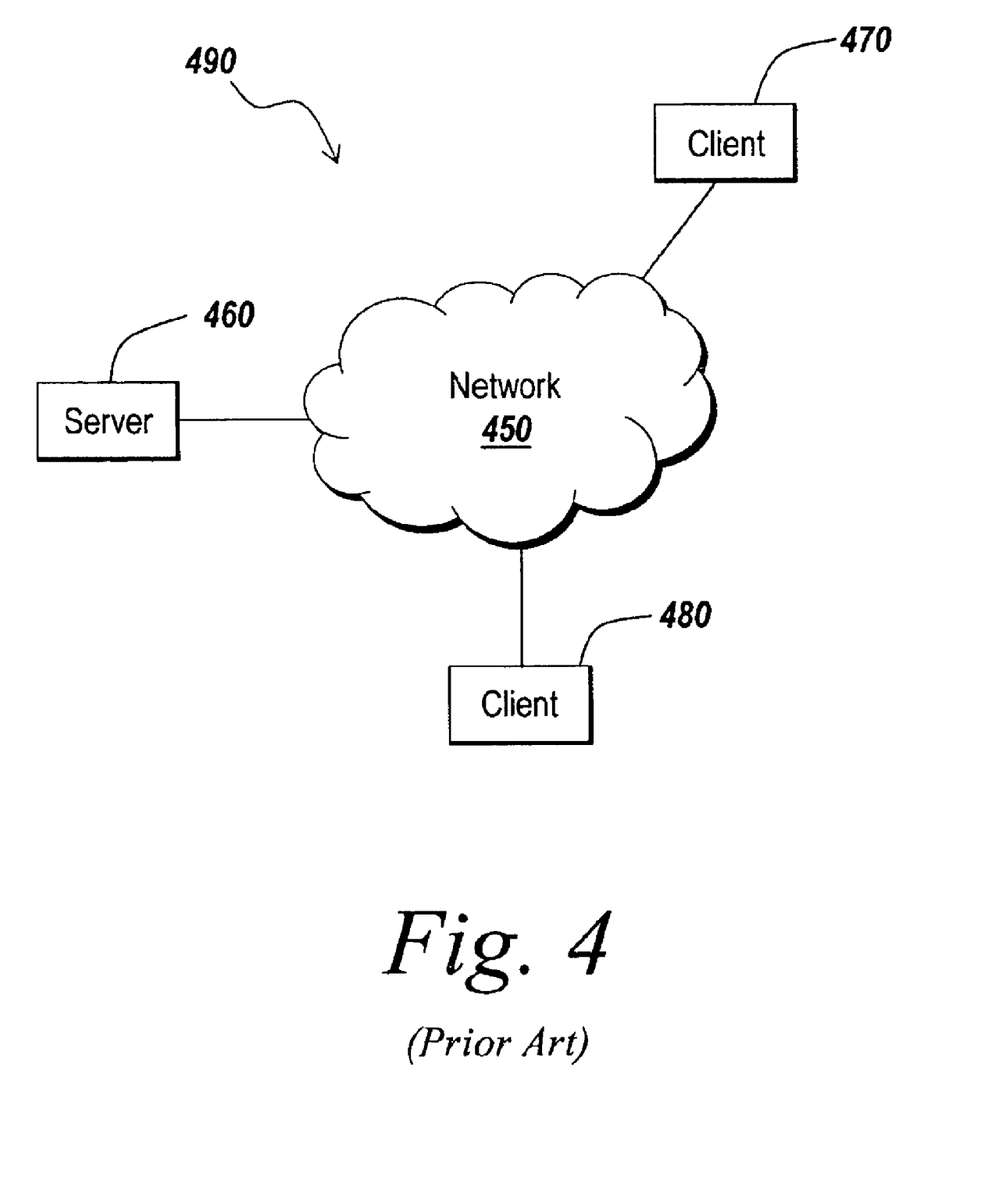
FIG. 4 shows an exemplary network environment suitable for practicing principles of the invention.

FIG. 4 is an exemplary network environment 490 suitable for the distributed implementation of the illustrative embodiment. The network environment 490 may include a server 460 coupled to clients 470 and 480 via a communication network 450. One skilled in the art will recognize this server client arrangement as illustrative of a sample environment, but not limiting. The server 460 and clients 470 and 480 can be implemented using the computing device 200 depicted in FIG. 2A. The network interface 260 and the modem 250 of the computing device 200 enable the server 460 to communicate with the clients 470 and 480 through the communication network 450. The communication network 450 may include Internet, intranet, LAN (Local Area Network), WAN (Wide Area Network), MAN (Metropolitan Area Network), etc. The communication facilities can support the distributed implementations of the present invention.

In the network environment 490, the server 460 may provide the clients 470 and 480 with software components or products under a particular condition, such as a license agreement. The software components or products may include those for providing a block diagram environment and those for creating a block diagram in the block diagram environment. The software components or products may also include those for providing one or more coding standards and those for applying the coding standard to the block diagram. The server 460 may send the clients 470 and 480 the software components or products under a specific license agreement.

Figure 5:
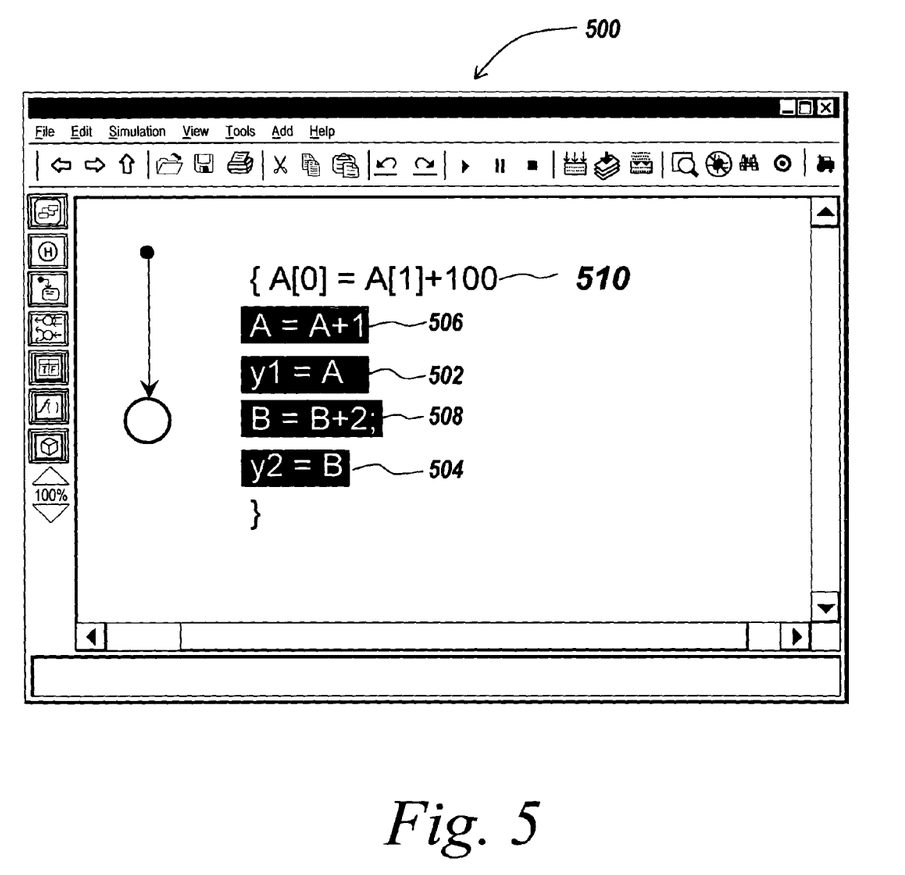
FIG. 5 shows another exemplary Stateflow® diagram.

FIG. 5. is an illustrative Stateflow® diagram illustrating the reference to a data store memory location located outside of the Stateflow® environment. In accordance with FIG. 5, a reference to two data store memory (DSM) locations is illustrated (502, 504). The first DSM reference assigns the value of a DSM named "A" to output "y1", while the second assigns the value of a DSM named "B" to output "y2". These DSM references may both be within a time driven environment such as Simulink®. The declaration of data A and B as data store memory locations "A" and "B" binds these variables to the respective DSM locations and A and B can be used within the Stateflow® environment for computation. One example of using such a binding is illustrated in 510 wherein 100 is added to the value of the second element in a vectorized variable A with a memory location specified by a DSM and assigned to the first element in the vectorized variable A. On the next line 506, scalar expansion is applied to the vectorized variable A and the value 1 is added to each of the elements in the vector. Within the Stateflow® environment, this binding occurs just like the binding of any other variable, even though the reference to the "A" or "B" DSM is not within the Stateflow® environment. The integration of DSM references within the Stateflow® environment can occur on states or transitions, thereby allowing the introduction of a DSM reference to either state or transition action statements. By definition, state actions statements are those which trigger following a change in state. Transition action statements are sequences of segments within the Stateflow® environment that lead from an active original state to a final destination state.

Figure 6:
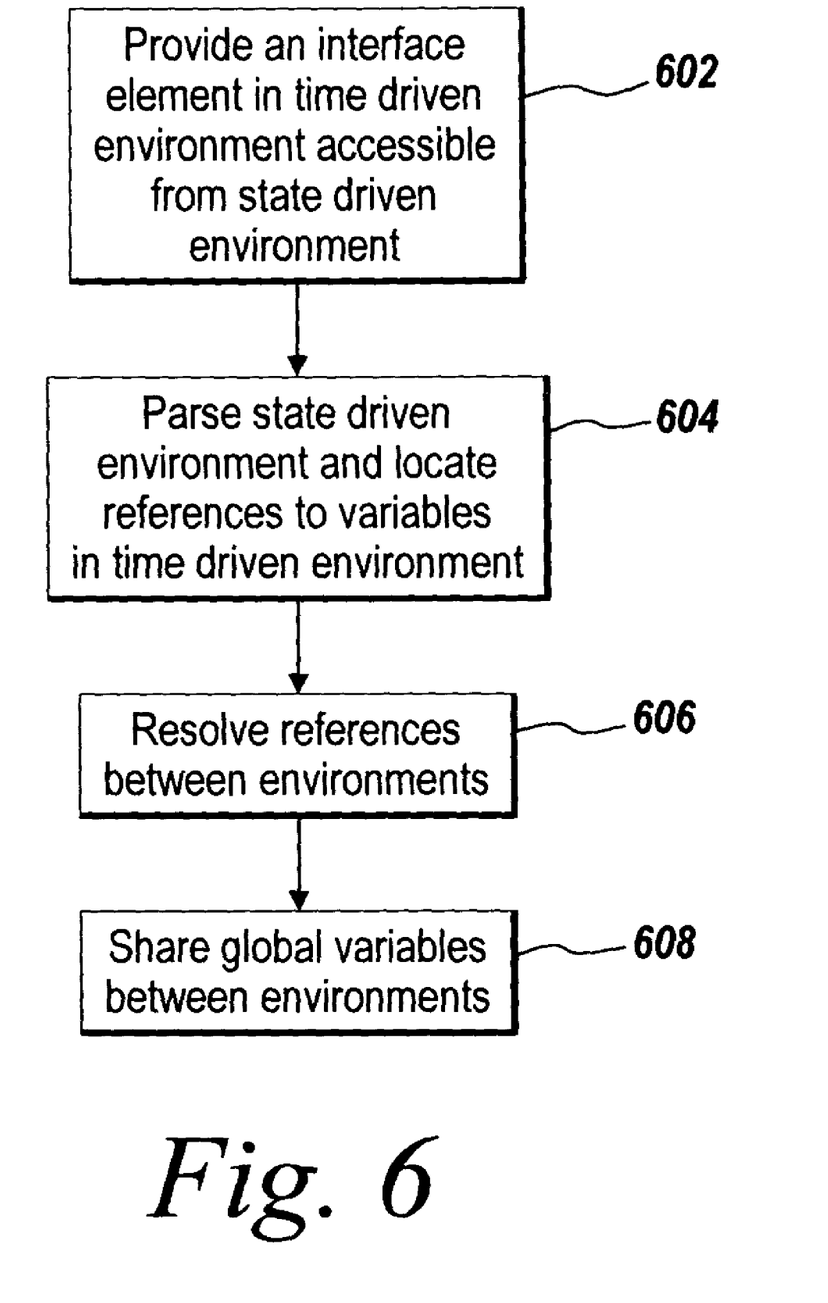
FIG. 6 shows a flowchart representing the steps preformed in practicing an embodiment of the present invention.

FIG. 6 is a flowchart illustrating the steps necessary in practicing one embodiment of the present invention. As illustrated in step 602, an interface element is provided within the time driven environment, wherein the interface element may be accessed from the state driven environment. In one embodiment, when operating within the Simulink® and Stateflow® environments, this interface element may be a Data Store Memory element, represented by a Data Store Memory block 302 of FIG. 3. This Data Store Memory block 302 provides for the defining and initializing of a named shared data store space. This data store may be, but is not limited to, a memory allotment on a processor. To provide access to both Simulink® and Stateflow® environments, this Data Store Memory block may further have a Data Store Read and Data Store Write block associated with it such that these blocks can be used in sharing a data store among environments.

Following the establishing of an interface element, the state driven environment is parsed, wherein all references to variables that exist within the time driven environment (step 604) are located. As each data store is identified by a specific name, for example "DataStoreA", a user of a state driven environment may simply reference this specific data store located within the time driven environment by name from within the state driven environment programming language. When working with a Stateflow® environment, for example, a user may simply reference data store "A" from within a state or transition action statement. An example of this is seen in FIG. 5, where the data store "A" is defined as "A+1" 506. One skilled in the art will recognize that a variety of naming conventions and access configurations may exist such that this data, herein represented as data stores, may be defined and located during the parsing step. The parsing of the state and transition labels within the state driven environment, in order to located references to data to be shared in a time driven environment, may use various means. When working with a Stateflow® environment, for example, an abstract syntax tree (AST) may be created such that Stateflow® states and transitions are clearly mapped. Using an AST, references to global variables or functionality data in a time driven environment may then be readily located. Following parsing of the state driven environment, and the location of references to data such as variables or functionality data in the time driven environment, these references (i.e. data stores) are resolved in accordance with step 606.

Resolution of variables between environments may take numerous forms. In one embodiment of the present invention, resolution of references between environments may be accomplished using an intermediate representation. The intermediate representation allows for the change in levels of abstraction across environments, or computer programming languages. In the present embodiment, the term "intermediate representation" is used herein to refer to a data structure that is stored in memory, in a file, in a database, or any other storage medium, and that is constructed from input data contained within a first programming environment or language and from which part or all of the second programming environment or language data is constructed in turn. In the present invention the associated intermediate representation allows for the interface of a Stateflow® environment with a Simulink® environment. The resolution of references using an intermediate representation may be accomplished using a variety of means. In one example, the Real-Time Workshop® (RTW) coder, offered by The MathWorks of Natick, Mass. may be employed in generating an appropriate intermediate representation. This coder can be utilized in converting Stateflow® environment and language into a Simulink® compatible language and environment. The use of the RTW coder is a representative example, and those skilled in the art will readily recognize that the intermediate representation can be generated using numerous coding mechanisms. An alternate intermediate representation may employ an abstract syntax tree, wherein this abstract syntax tree is mapped to Stateflow® objects and subsequently used to point to Data Store Memory blocks within the Simulink® environment.

Further associated with the resolution or references between environments (step 606) is the generation of target specific transformations. These target specific transformations may identify a portion of the intermediate representation to be transformed and subsequently modify that portion of the intermediate representation to yield an intended format. The application of a target specific transform, when used in sharing a global Simulink® environment variable with a Stateflow® environment, therefore serves to replace Data Store memory read and write operations with explicit function calls. In one embodiment, these function calls may be executed at runtime within the Simulink® environment.

In accordance with step 608, following the resolution of references between environments, one or more pieces of data, such as a global variable or functionality data, may in turn be shared between these environments. The sharing of data in the time driven environment may take numerous forms. For example, this shared data may simply be passed to another application, such as Stateflow® for example, or in turn may be further processed such that executable code is generated for use by an alternative program or processor.

Figure 7:
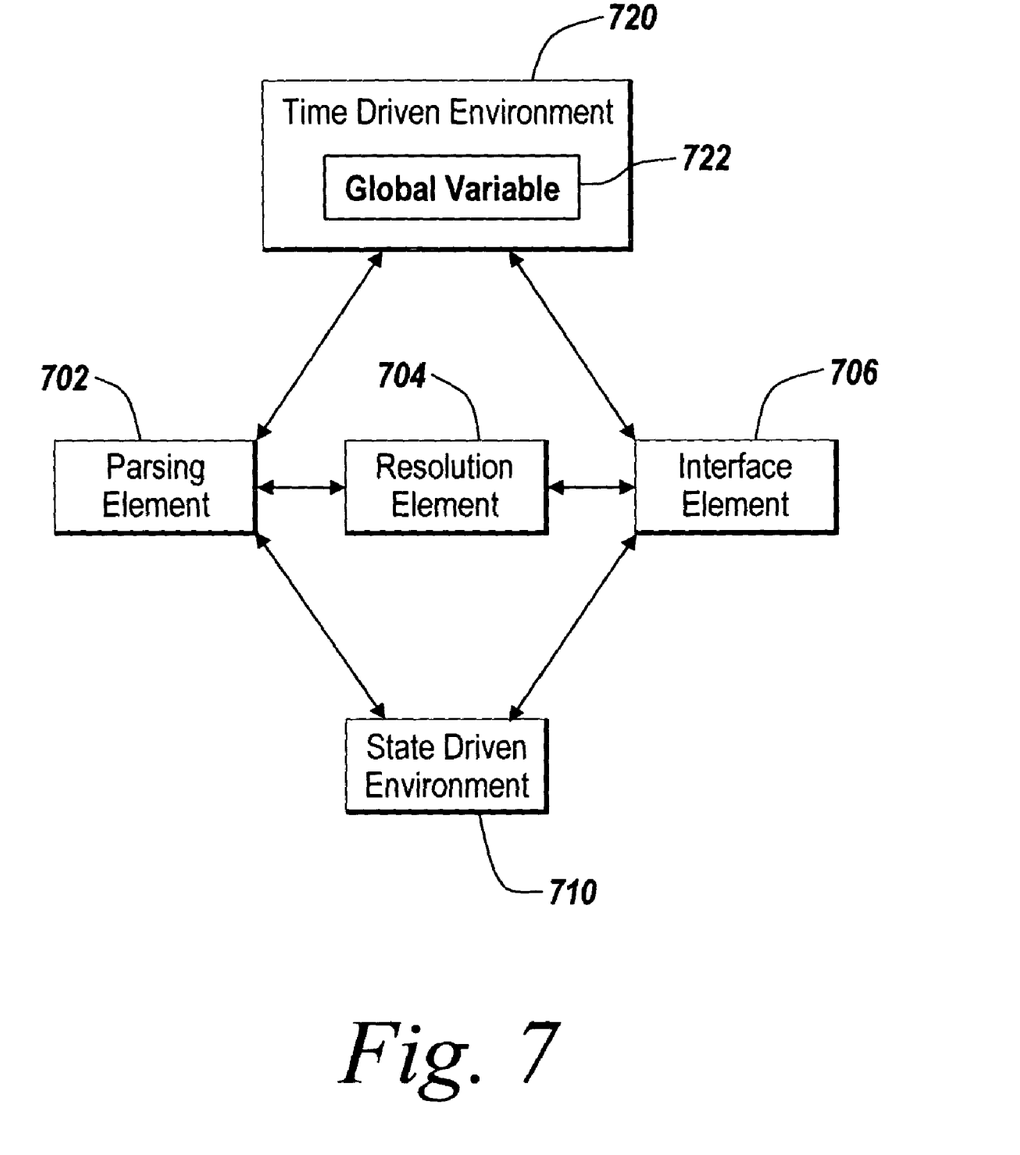
FIG. 7 shows a block diagram of software modules suitable for practicing principles of the invention.

FIG. 7 is an illustrative example of a system for practicing one embodiment of the present invention. As illustrated in FIG. 7, a time driven environment 720 and a state driven environment 710 are provided. As set for the prior these environments may be represented by Simulink® and Stateflow® respectively. Associated with both environments is a parsing element 702 capable of locating global references to data in the time driven environment 720 which are called out by name from within state/transition actions statements within the state driven environment 710. As illustrated, this parsing element is in communication with both state driven environment 710 and the time driven environment 720, yet one skilled in the art will recognize that such communication may be modified as necessary. In communication with the parsing element 702 is a resolution element 704. Said resolution element 704 may utilize numerous approaches for sharing a time driven global variable 722 with a state driven environment, including but not limited to the use of an intermediate representation and various transforms. The results of the resolution element 704 are passed to the interface element 706 such that the global variable 722 within the time driven environment may be adequately shared with the state driven environment 710. One skilled in the art will recognize that the parsing element 702, resolution element 704 and interface element 706, while presently located external to both the time driven environment 720 and the state driven environment, may take numerous alternative forms and arrangements. The present orientation is used solely to aid in illustrating the elements of the present invention and is not intended to limit the scope of that which is herein claimed. A skilled practitioner will recognize that the parsing element 702, resolution element 704 and interface element 706 may be located within the time driven environment 720, state driven environment 710, external to either time driven environment 720 or state driven environment, or some combination thereof. Furthermore, an executable code generating element may be associated with the present embodiment such that executable code capable of execution on a processor may be generated.

Figure 8:
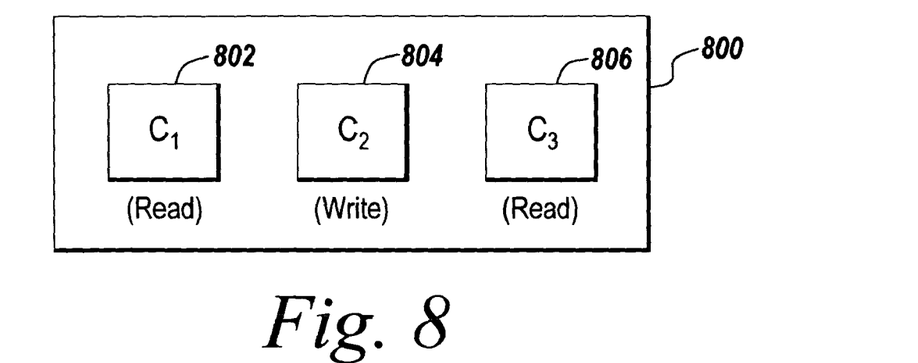
FIG. 8 shows an example of an error condition detected by an embodiment of the present invention
Figure 9:
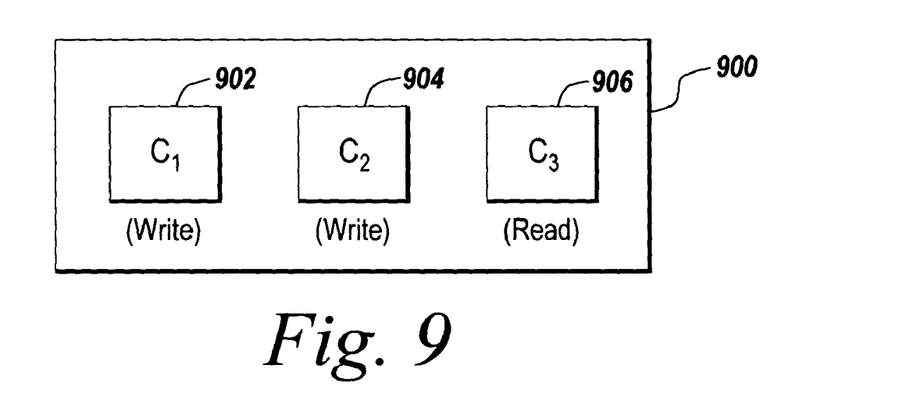
FIG. 9 shows an example of an error condition detected by an embodiment of the present invention.
Figure 10:
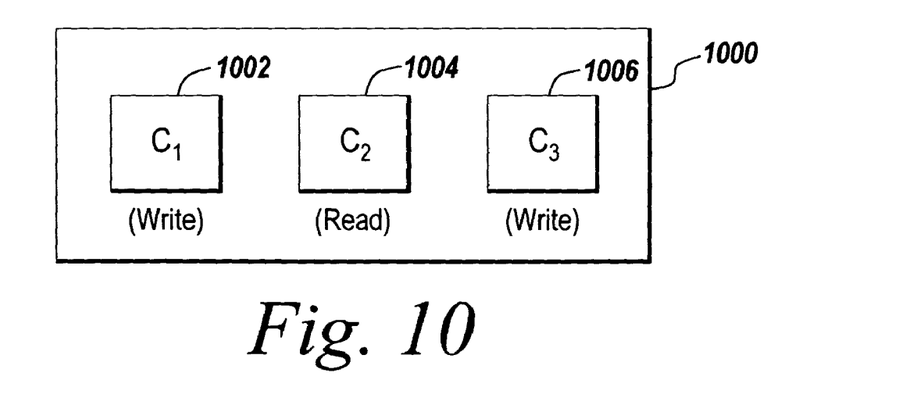
FIG. 10 shows an example of an alternate error condition detected by an embodiment of the present invention.

When sharing time based environment data with a state based environment there are several potential errors that may occur. Examples of such errors are illustrated in FIGS. 8, 9, and 10. FIG. 8 illustrate a Read before write error 800 example. As illustrated in FIG. 8, a single data store 800 may have numerous conditions associated with it. These conditions within the single data store 800 are illustrated as C1 (802), C2 (804) and C3 (806), thereby showing the transition of read or write status of the overall data store 800 at any given time. Should this data store 800 be associated with a time driven environment such as the Simulink® environment, it becomes difficult to determine if these data stores states (802, 804, 806) are being partially written to at any given moment or if they are a complete assignment of data. In light of this, the actual status and state of each data store is not known by Simulink®, thereby resulting in potential computational and simulation errors. Furthermore, when operating within a Stateflow® environment, data stores may be manipulated such that a data store is written to multiple times in the same time step. Such multiple writes may be used to allow the data store to operate as a temporary scratch area during computational events. Following the completion of all computations, the final value may be written to the data store.

In the present example, data store C1 (802) is first read. This read data may them-then be shared with a Stateflow® environment in accordance with the present invention. Following this data read (802) the data store 800 is written to (as designed by C2 (804)). As data has been written to data store C2 (804) after data was read from data store C1 (802) the Stateflow® and Simulink® environments are not using the most current data for computation. Because of this, processing and calculation errors may result.

FIG. 9 additionally illustrates another potential error, namely a write after write error. As illustrated in the present example, data store 900 C1 is written to 902 and then rewritten to 904 before a read subsequently occurs 906. In such an arrangement the data written to the data store 902 may never be passed to a state driven environment such as Stateflow®, thereby resulting in potential errors in computation.

Finally, FIG. 10 illustrates a write after read error 1000. In such an arrangement data is first written to data store C1 (1002) and then followed by a read of data store C2 (1004). Following this read, data is written to data store C3 (1006), wherein this data store now contains the most current data for eventual sharing between environments. As illustrated, however, the data for data store C2 (1004) is the set of data shared with the second environment.

Following the analysis and diagnosis of potential errors in computation and variable sharing using the diagnostic procedures of FIGS. 8, 9 and 10, should an error condition exists several actions may be taken. In one embodiment, a user may be made to know of the error condition and simulation of computation can be halted. In an alternate embodiment, the use of flags to track the read and write status of data stores may be employed such that the first or second environment may is kept aware of the status of data stores. For example, using such a flagging procedure, the Simulink® environment can be aware of data store rear or write status, thereby preventing the incorrect sharing of a Simulink® global variable with a second environment such as Stateflow®. These runtime diagnostics can be used by the user to detect unintentional execution in the Simulink diagram due to insufficient specification of the execution orders. The user can then use this information to explicitly specify the priorities (execution orders) on these blocks in the Simulink diagram to achieve the correct order of read/write accesses for the Data Store Memory.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

What is claimed is:

1. A computer-implemented method for sharing data between a first graphical modeling environment and a second graphical modeling environment, the first graphical modeling environment containing a plurality of executable elements, the second graphical modeling environment holding a model, the model being embedded in one of the plurality of executable elements of the first graphical modeling environment, comprising:
    providing the second graphical modeling environment is in communication with the first graphical modeling environment using a data store memory element that provides access to a shared data, the shared data:
        shared between the first graphical modeling environment and the second graphical modeling environment, and
        located in the first graphical modeling environment
    parsing the model in the second graphical modeling environment to locate references to the shared data,
    resolving the references from the model in the second graphical modeling environment to the first graphical modeling environment;
    enforcing a hierarchical restriction on access to the shared data, the enforcing comprising:
        determining a hierarchical location of the data store memory element in the first graphical modeling environment,
        determining a level of an attempt to access the data store memory element in the first graphical modeling environment, the attempt to access originating in the second graphical modeling environment, and permitting access to the shared data only by a model entity located at a same hierarchical location as the data store memory element or at a lower hierarchical location than the data store memory element, a hierarchical location of the model entity determined based on the level of the attempt to access the data store memory element in the first graphical modeling environment; and accessing the shared data from the second graphical modeling environment using the data store memory element if permitted by the hierarchical restriction.

2. The method of claim 1, wherein the data is a variable.

3. The method of claim 2, wherein the variable is a global variable.

4. The method of claim 1, wherein the data is functionality data.

5. The method of claim 4, wherein the functionality data is captured by a block.

6. The method of claim 4, wherein the functionality is an event.

7. The method of claim 1, wherein the first graphical modeling environment is a time-based environment.

8. The method of claim 1, wherein the second graphical modeling environment is a state-based environment.

9. The method of claim 1, further comprising generating an interface transformation, wherein the interface transformation provides for global variable sharing using the data store memory element.

10. The method of claim 1, further comprising generating an intermediate representation.

11. The method of claim 10, wherein said intermediate representation is an abstract syntax tree containing a plurality of symbols.

12. The method of claim 11, further comprising resolving the symbols.

13. The method of claim 11, further comprising mapping said symbols to the second graphical modeling environment.

14. A system for sharing data in a first graphical modeling environment with a second graphical modeling environment, the first graphical modeling environment containing a plurality of executable elements, the second graphical modeling environment holding a model, the model being embedded in one of the plurality of executable elements of the first graphical modeling environment, the system comprising:
a processor comprising:
a parsing element for locating references to shared data that exists in the first graphical modeling environment, the first graphical modeling environment enabling modeling dynamic systems,
a resolution element, wherein the resolution element resolves the references from the model in the second graphical modeling environment to the first graphical modeling environment, the second graphical modeling environment enabling modeling event-driven systems,
a data store memory element that provides access to the shared data using the results of the resolution element,
the processor enforcing a hierarchical restriction on access to the shared data, the enforcing comprising:
determining a hierarchical location of the data store memory element in the first graphical modeling environment,
determining a level of an attempt to access the data store memory element in the first graphical modeling environment, the attempt to access originating in the second graphical modeling environment, and permitting access to the shared data only by a model entity located at a same hierarchical location as the data store memory element or at a lower hierarchical location than the data store memory element, a hierarchical location of the model entity determined based on the level of the attempt to access the data store memory element in the first graphical modeling environment; and a storage, the storage storing the shared data.

15. The system of claim 14, wherein the system further comprises an executable code generating element, wherein said element generates code which is executable on a processor.

16. The system of claim 15, wherein the data is a variable.

17. The system of claim 16, wherein the variable is a global variable.

18. The system of claim 15, wherein the data is functionality data.

19. The system of claim 18, wherein the functionality data is captured by a block.

20. The system of claim 18, wherein the functionality is an event.

21. A non-transitory computer readable medium holding instructions for sharing data in a first graphical modeling environment with a second graphical modeling environment, the first graphical modeling environment enabling modeling dynamic systems and the second graphical modeling environment enabling modeling event-driven systems, the first graphical modeling environment containing a plurality of executable elements, the second graphical modeling environment holding a model, the model being embedded in one of the plurality of executable elements of the first graphical modeling environment, the instructions causing a processor to:
provide a data store memory element in said first graphical modeling environment that provides access to shared data, the shared data:
shared between the first graphical modeling environment and the second graphical modeling environment, and
located in the first graphical modeling environment, wherein the data store memory element is accessible from the second graphical modeling environment;
parse the model in the second graphical modeling environment to locate references to the shared data;
resolve the references from the second graphical modeling environment to the first graphical modeling environment; and
share the shared data in the first graphical modeling environment with the second graphical modeling environment using the data store memory element, wherein sharing the data comprises enforcing a hierarchical restriction on access to the shared data, the enforcing comprising:
determining a hierarchical location of the data store memory element in the first graphical modeling environment,
determining a level of an attempt to access the data store memory element in the first graphical modeling environment, the attempt to access originating in the second graphical modeling environment, and
permitting access to the shared data only by a model entity located at a same hierarchical location as the data store memory element or at a lower hierarchical location than the data store memory element, a hierarchical location of the model entity determined based on the level of the attempt to access the data store memory element in the first graphical modeling environment.

22. The computer readable medium of claim 21 wherein instructions further cause a processor to generate references to data within the second graphical modeling environment using an intermediate representation.

23. The computer readable medium of claim 22 wherein the intermediate representation is an abstract symbol tree containing a plurality of symbols.

24. A distribution system for transmitting, via a transmission medium, computer data signals representing device readable instructions for sharing data in a first graphical modeling environment with a second graphical modeling environment, the first graphical modeling environment enabling modeling dynamic systems and the second graphical modeling environment enabling modeling event-driven systems, the first graphical modeling environment containing a plurality of executable elements, the second graphical modeling environment holding a model, the model being embedded in one of the plurality of executable elements, the distribution system comprising:
   a processor comprising:
      a data store memory element that provides access to a-shared data, the data store memory element being in the first graphical modeling environment and accessible from the second graphical modeling environment, the shared data:
         shared between the first graphical modeling; environment and the second graphical modeling environment
      a parsing element to parse the model in the second graphical modeling environment to locate references to the shared data;
      a resolving element to resolve the references from the second graphical modeling environment to the first graphical modeling environment;
      a sharing element to share the shared data using the data store memory element, wherein sharing the data comprises enforcing a hierarchical restriction on access to the shared data, the enforcing comprising:
         determining a hierarchical location of the data store memory element in the first graphical modeling environment,
         determining a level of an attempt to access the data store memory element in the first graphical modeling environment, the attempt to access originating in the second graphical modeling environment, and
         permitting access to the shared data only by a model entity located at a same hierarchical location as the data store memory element or at a lower hierarchical location than the data store memory element, a hierarchical location of the model entity determined based on the level of the attempt to access the data store memory element in the first graphical modeling environment; and
   a storage storing the shared data.

25. A computer-implemented diagnostic method for sharing data in a first graphical modeling environment with a second graphical modeling environment, the first graphical modeling environment enabling modeling dynamic systems and the second graphical modeling environment enabling modeling event-driven systems, the first graphical modeling environment containing a plurality of executable elements, the second graphical modeling environment holding a model, the model being embedded in one of the plurality of executable elements of the first graphical modeling environment, the method comprising the steps of:
   displaying at least one of the first graphical modeling environment and the second graphical modeling environment on a display device;
   providing a data store memory element that provides access to shared data, the data store memory element accessible by the first and second graphical modeling environments, the shared data:
      shared between the first graphical modeling environment and the second graphical modeling environment, and
      located in the first graphical modeling environment;
   parsing the model in the second graphical modeling environment to locate references to the shared data;
   resolving the references from the second graphical modeling environment to the first graphical modeling environment;
   sharing the shared data using the data store memory element, the sharing comprising enforcing a hierarchical restriction on access to the shared data, the enforcing comprising:
      determining a hierarchical location of the data store memory element in the first graphical modeling environment,
      determining a level of an attempt to access the data store memory element in the first graphical modeling environment, the attempt to access originating in the second graphical modeling environment, and
      permitting access to the shared data only by a model entity located at a same hierarchical location as the data store memory element or at a lower hierarchical location than the data store memory element, a hierarchical location of the model entity determined based on the level of the attempt to access the data store memory element in the first graphical modeling environment; and
   analyzing the sharing of the shared data to diagnose sharing errors.

26. The method of claim 25, wherein analyzing the sharing of the data further comprises the step of diagnosing read before write errors, read before write errors occurring when reading data from the data store memory element occurs before writing data to the data store memory element.

27. The method of claim 25, wherein analyzing the sharing of the data further comprises the step of diagnosing write after write errors, write after write errors occurring when writing data to the data store memory element occurs after writing data to the data store memory element.

28. The method of claim 25, wherein analyzing the sharing of the data further comprises the step of diagnosing write after read errors, write after read errors occurring when writing data to the data store memory element occurs after reading data from the data store memory element.

29. The method of claim 25, wherein said first graphical modeling environment is a time-based environment.

30. The method of claim 25, wherein said second graphical modeling environment is a state-based environment.

31. The method of claim 25, wherein the step of analyzing the sharing of data is accomplished using flags to diagnose global variable sharing between a first and second graphical modeling environment.

32. A system for data sharing between a first graphical modeling environment and a second graphical modeling environment, the first graphical modeling environment enabling modeling dynamic systems and the second graphical modeling environment enabling modeling event-driven systems, the first graphical modeling environment containing a plurality of executable elements, the second graphical modeling environment holding a model, the model being embedded in one of the plurality of executable elements of the first graphical modeling environment, the system comprising;
a processor comprising:
a data store memory element that provides access to shared data, the shared data:
shared between the first graphical modeling environment and the second graphical modeling environment, and
located in the first graphical modeling environment;
a parsing element for parsing the model in the second graphical modeling environment to locate references to the shared data;
a resolving element for resolving the references from the model in the second graphical modeling environment to the first graphical modeling environment;
a sharing mechanism, said sharing mechanism capable of sharing the shared data between said first and second graphical modeling environments using said data store memory element, wherein sharing the data comprises enforcing a hierarchical restriction on access to the shared data, the enforcing comprising:
determining a hierarchical location of the data store memory element in the first graphical modeling environment,
determining a level of an attempt to access the data store memory element in the first graphical modeling environment, the attempt to access originating in the second graphical modeling environment, and
permitting access to the shared data only by a model entity located at a same hierarchical location as the data store memory element or at a lower hierarchical location than the data store memory element, a hierarchical location of the model entity determined based on the level of the attempt to access the data store memory element in the first graphical modeling environment;
an analysis element, said analysis element analyzes data sharing to diagnose sharing errors between said first and second graphical modeling environments; and
a storage, said storage storing the shared data.

33. The system of claim 32, wherein the analysis element further diagnoses read before write errors, read before write errors occurring when reading data from the data store memory element occurs before writing data to the data store memory element.

34. The system of claim 32, wherein the analysis element further diagnoses write after write errors, write after write errors occurring when writing data to the data store memory element occurs after writing data to the data store memory element.

35. The system of claim 32, wherein the analysis element further diagnoses write after read errors, write after read errors occurring when writing data to the data store memory element occurs after reading data from the data store memory element.

36. The system of claim 32, wherein said first graphical modeling environment is a time-based graphical modeling environment.

37. The system of claim 32, wherein said second graphical modeling environment is a state-based environment.

38. The system of claim 32, wherein the analysis element uses flags to diagnose data sharing between a first and second graphical modeling environment.

39. The system of claim 32, wherein the sharing mechanism parses the second graphical modeling environment to locate references to data in a first graphical modeling environment.

40. The system of claim 32, wherein the sharing mechanism resolves references from the second graphical modeling environment to the first graphical modeling environment.

41. The system of claim 40, wherein an intermediate representation is used to resolve references.

42. A non-transitory computer readable medium holding instructions for sharing data between a first graphical modeling environment and a second graphical modeling environment, the first graphical modeling environment enabling modeling dynamic systems and the second graphical modeling environment enabling modeling event-driven systems, the first graphical modeling environment containing a plurality of executable elements, the second graphical modeling environment holding a model, the model being embedded in one of the plurality of executable elements of the first graphical modeling environment, the instructions causing a processor to:
provide a data store memory element that provides access to shared data, the shared data:
shared between the first graphical modeling environment and the second graphical modeling environment, and
located in the first graphical modeling environment;
parse the model in the second graphical modeling environment to locate references to the shared data;
resolve the references from the model in the second graphical modeling environment to the first graphical modeling environment;
share the shared data between said first and second graphical modeling environments using said data store memory element, sharing the data comprising enforcing a hierarchical restriction on access to the shared data, the enforcing comprising:
determining a hierarchical location of the data store memory element in the first graphical modeling environment,
determining a level of an attempt to access the data store memory element in the first graphical modeling environment, the attempt to access originating in the second graphical modeling environment, and
permitting access to the shared data only by a model entity located at a same hierarchical location as the data store memory element or at a lower hierarchical location than the data store memory element, a hierarchical location of the model entity determined based on the level of the attempt to access the data store memory element in the first graphical modeling environment;
analyze the sharing of data within said first graphical modeling environment to diagnose sharing errors between said first and second graphical modeling environments; and
store the shared data in a storage.

43. A distribution system for transmitting, via a transmission medium, computer data signals representing device readable instructions for sharing data between a first graphical modeling environment and a second graphical modeling environment, the first graphical modeling environment enabling modeling dynamic systems and the second graphical modeling environment enabling modeling event-driven systems, the first graphical modeling environment containing a plurality of executable elements, the second graphical modeling environment holding a model, the model being embedded in one of the plurality of executable elements of the first graphical modeling environment, the distribution system comprising:

a data store memory element that provides access to shared data, the shared data:
shared between the first graphical modeling environment and the second graphical modeling environment, and
located in the first graphical modeling environment;

a processor that enables:
parsing of the model in the second graphical modeling environment to locate references to the shared data;
resolution of the references from the model in the second graphical modeling environment to the first graphical modeling environment
sharing the shared data between said first and second graphical modeling environment using said data store memory element, the sharing comprising enforcing a hierarchical restriction on access to the shared data, the enforcing comprising:
determining a hierarchical location of the data store memory element in the first graphical modeling environment,
determining a level of an attempt to access the data store memory element in the first graphical modeling environment, the attempt to access originating in the second graphical modeling environment, and
permitting access to the shared data only by a model entity located at a same hierarchical location as the data store memory element or at a lower hierarchical location than the data store memory element, a hierarchical location of the model entity determined based on the level of the attempt to access the data store memory element in the first graphical modeling environment;
analyzing the sharing of data within said first graphical modeling environment to diagnose sharing errors between said first and second graphical modeling environments; and
a storage storing the shared data.

* * * * *